(12) United States Patent
Kanki

(10) Patent No.: US 7,003,947 B2
(45) Date of Patent: Feb. 28, 2006

(54) GYRO WAVE ACTIVATED POWER GENERATOR AND A WAVE SUPPRESSOR USING THE POWER GENERATOR

(75) Inventor: Hiroshi Kanki, Hyogo (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/472,224

(22) PCT Filed: Mar. 22, 2002

(86) PCT No.: PCT/JP02/02775

§ 371 (c)(1),
(2), (4) Date: Sep. 22, 2003

(87) PCT Pub. No.: WO02/077369

PCT Pub. Date: Oct. 3, 2002

(65) Prior Publication Data

US 2004/0134190 A1    Jul. 15, 2004

(30) Foreign Application Priority Data

Mar. 26, 2001 (JP) .............................. 2001-88011

(51) Int. Cl.
F02B 3/06 (2006.01)
F02B 9/08 (2006.01)
F03B 13/14 (2006.01)
F03B 13/16 (2006.01)
F16D 31/02 (2006.01)

(52) U.S. Cl. .......................... 60/398; 60/496; 60/497; 60/501; 60/502; 60/503; 60/505; 60/506; 290/42; 290/53; 415/916; 417/331

(58) Field of Classification Search ................ 60/398, 60/495, 496, 497, 498, 499, 500, 501, 502, 60/503, 504, 505, 506, 507; 290/42, 53; 415/916; 417/330, 331, 332, 333
See application file for complete search history.

(56) References Cited

U.S. PATENT DOCUMENTS

| 4,352,023 A | * | 9/1982 | Sachs et al. | .................. 290/42 |
| 6,561,856 B1 | * | 5/2003 | Gorshkov | ...................... 440/9 |
| 6,888,262 B1 | * | 5/2005 | Blakemore | .................... 290/44 |

FOREIGN PATENT DOCUMENTS

| GB | 2248689 A * | 4/1992 |
| JP | 05-164036 A1 | 6/1993 |
| JP | 06-280240 A1 | 10/1994 |
| JP | 07-216859 A1 | 8/1995 |
| JP | 07-333664 A1 | 12/1995 |

* cited by examiner

Primary Examiner—Sheldon J Richter
(74) Attorney, Agent, or Firm—Rader, Fishman & Grauer PLLC

(57) ABSTRACT

A gyro wave-activated power generator utilizing wave energy which has, as a component, a control moment gyro, and which comprises a floating body (1), a control moment gyro (5) supported by the floating body, and a power generator (10) connected to the gimbal shaft of the gyro through a gearing to increase speed(9), and is characterized by the gimbal (6) of the gyro being rotated by the movement of the floating body by wave energy to drive the power generator (10) for power generation.

19 Claims, 6 Drawing Sheets

GYRO WAVE ACTIVATED POWER GENERATOR AND A WAVE SUPPRESSOR USING THE POWER GENERATOR

FIELD OF TECHNOLOGY

The present invention relates to a gyro wave-activated power generator utilizing wave energy which has, as a component, a control moment gyro.

BACKGROUND ART

Global environmental problems including global warming are recently being seriously studied throughout the world. It is necessary to actively promote the use of clean natural energy.

The use of natural energy typically includes photovoltaic power generation, wind power generation, and wave-activated power generation. Photovoltaic and wind power generation are commercially available. However, the production of solar panels involves significant costs. In Japan, where earthquakes and typhoons frequently occur, wind power generation plants must be constructed with extra strength. Vast land areas are required to construct large-scale wind power generation farms.

As Japan is an island nation surrounded by the sea on all sides, wave power generation is a promising energy source. Wave power generation is being actively studied in Japan but the technology has not yet reached commercial levels.

Various systems for wave power generation have been proposed and experiments conducted. Many of these systems utilize the vertical motion of waves to create a flow of air or water, with the flow guided through a duct to rotate a turbine (Kokai Tokkyo Koho (Publication of unexamined patent applications) No. 6-280240 (1994) and 5-164036 (1993), etc.). Small-sized floating power generators based on these inventions have already been put to commercial application as navigation aids. Experiments on large-sized floating wave power generators currently underway include Kaimei (80 m in total length, 12 m in width, and weighing 800 tons) of the Japan Marine Science and Technology Center and, the stationary type Sanze model (Research Development Corporation of Japan, etc.).

Wave-activated power generators using fluids, such as those mentioned above, are generally inefficient at generating electric power because of the severity of existing conditions like wave magnitude. Improving efficiency requires increasing the size of the system, which in turn means significant investments that the system uneconomical.

The present invention intends to solve the above problems by offering a small-sized and efficient wave-activated power generator. According to the present invention, the motion of a floating body on the sea is converted into energy by a control moment gyro to generate power. A wave suppressor using said power generator is also offered.

The wave-activated power generator of the present invention comprises an enclosed gimbal, a flywheel which is set in the gimbal and turns on the spin shaft that is mounted at right angles to the gimbal shaft, a spin motor to turn the flywheel at high speed, and a power generator connected to the gimbal shaft via a gearing to increase speed, wherein the motion of the floating body produced by wave action is used to turn the gimbal to generate power. The system of the present invention is provided with a sensor to detect the inclination and angular velocity of the floating body and an encoder to detect the rotational angle and position of the gimbal. Signals from the sensor are used to synchronize the motion of the floating body with the rotation of the control moment gyro body for more efficient power generation. The efficiency of power generation is further enhanced by matching the gimbal rotation to the wave motion, which is basically a circular motion.

DISCLOSURE OF THE INVENTION

The means of the technical solution offered by the present invention is a gyro wave-activated power generator that comprises a floating body, a control moment gyro supported on said floating body, and a power generator connected to the gimbal shaft of said gyro via gearing to increase speed, wherein the motion of the floating body produced by wave action is used to turn the gimbal of said gyro to generate power.

The present invention further intends to provide a gyro wave-activated power generator wherein multiple control moment gyros are set on said floating body to generate power from each of the respective gyros.

The present invention also intends to provide a gyro wave-activated power generator wherein ballast water is pumped into said floating body to change the natural frequency of the floating body to synchronize its frequency with the wave frequency.

The present invention also intends to provide a gyro wave-activated power generator wherein the rotational speed of said gyro is controlled in such a manner that the rotation of the control moment gyro body synchronizes with the motion of said floating body.

The present invention also provides a wave suppressor wherein multiple gyro wave-activated power generators of the present invention are arrayed on the water surface.

BEST MODE OF IMPLEMENTATION OF THE INVENTION

The gyro wave-activated power generator of the present invention, which comprises a control moment gyro, a power generator, and a controller, is described below referring to the attached drawings.

Figure 1:
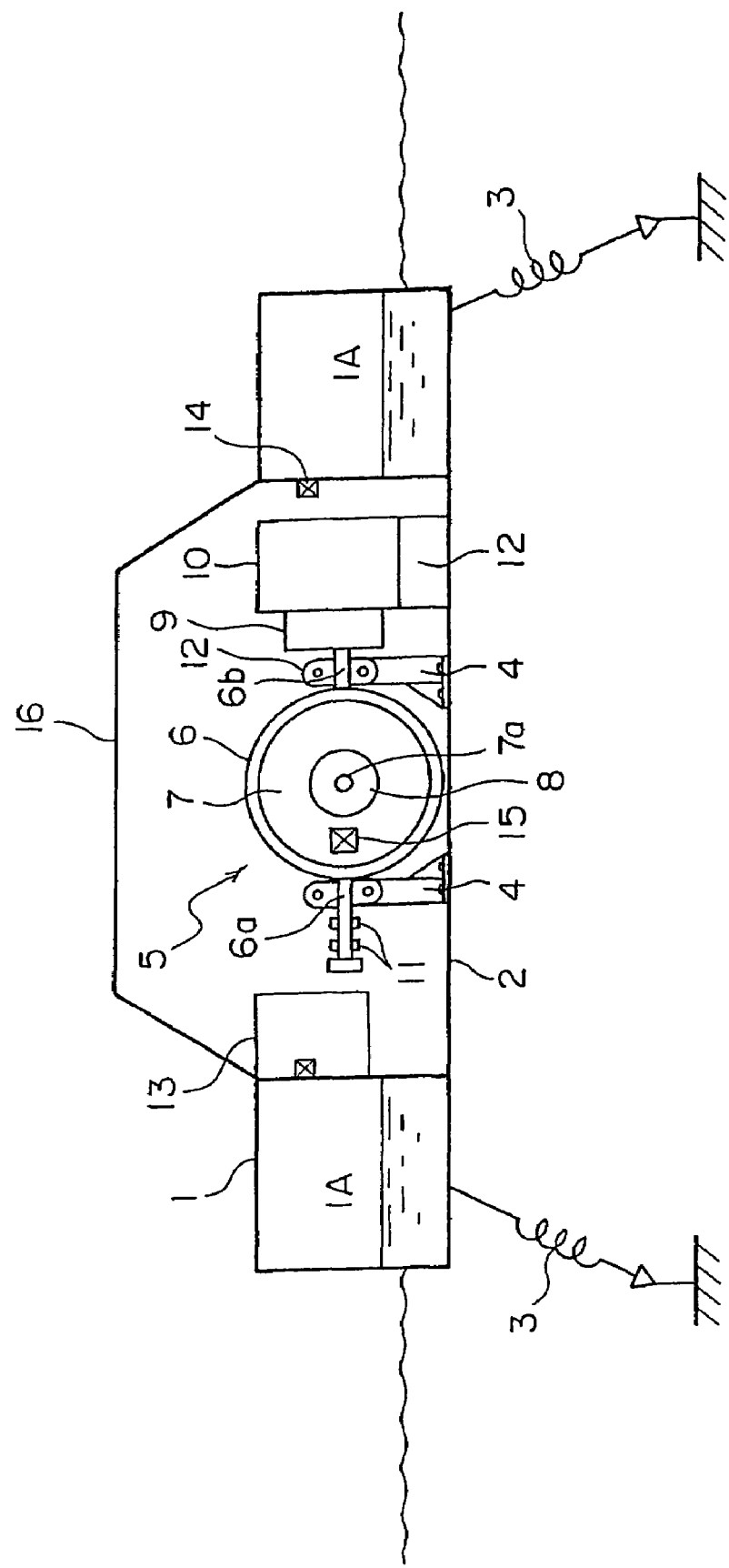
FIG. 1 is a cross-sectional view of the gyro wave-activated power generator of the present invention that comprises a control moment gyro, a power generator, and a controller.
Figure 2:
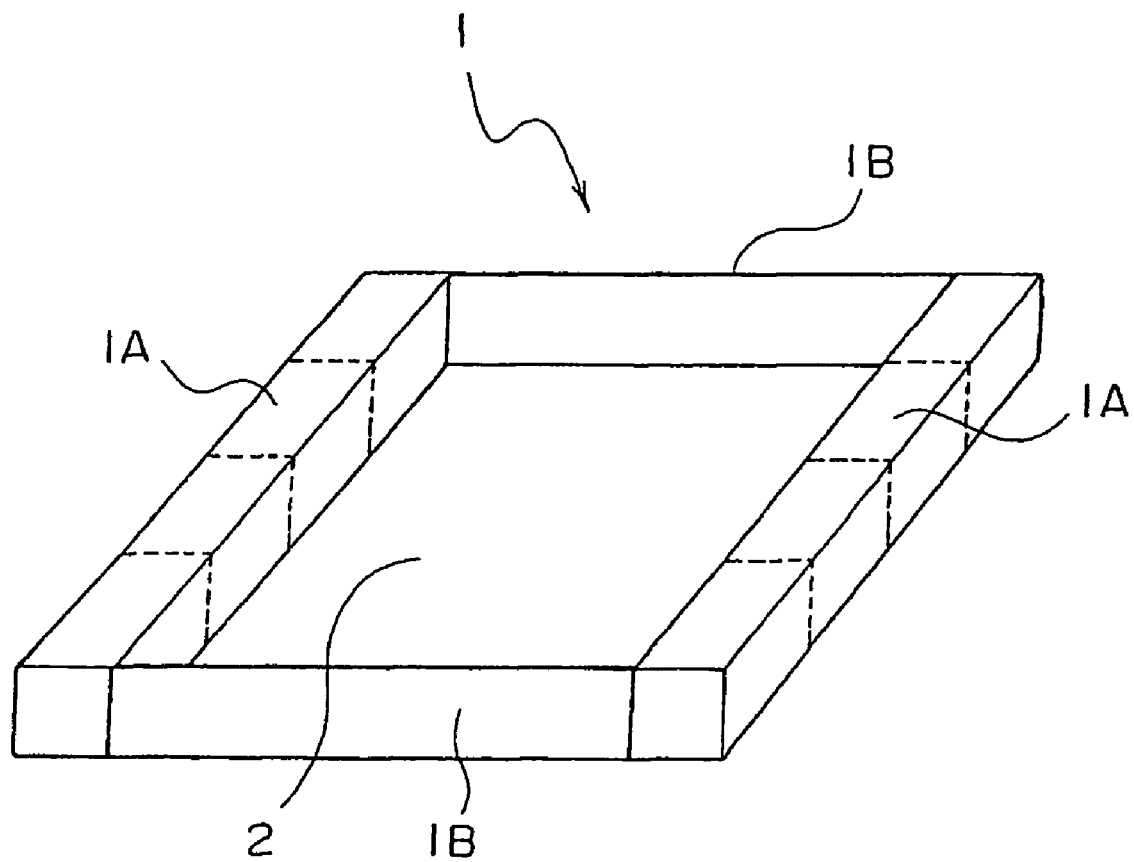
FIG. 2 is an oblique view of the floating body used in the gyro wave-activated power generator of the present invention.
Figure 3:
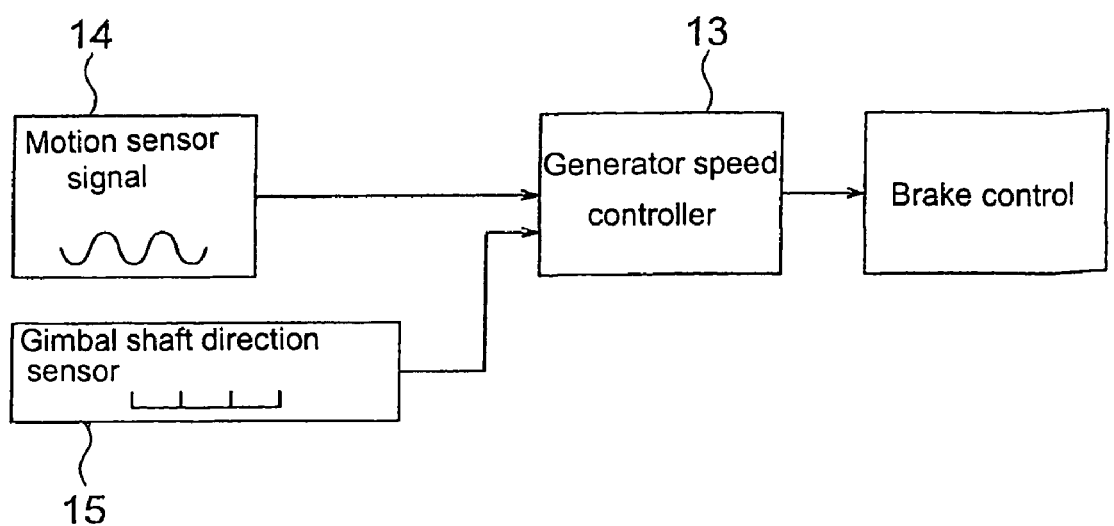
FIG. 3 is the control block diagram for the floating body of the gyro wave-activated power generator of the present invention.

FIG. 1 is a cross-sectional view of the first working example of the power generator of the present invention. FIG. 2 is an oblique view of the floating body used in the present invention. FIG. 3 is the control block diagram. FIG.

4 is the plan of a typical layout of an array of control moment gyros of the present invention.

In FIG. 1, the main floating body (1), roughly square in shape, comprises two floating sub-bodies (1A) which are connected by two members (1B). The control moment gyro power generator, which is described later, is positioned at the center of the bottom (2) of said square floating body. The main floating body (1) is fixed to the sea bottom with anchors (3). The main floating body (1) may not necessarily be square in shape but may also be of any other shape that can resist possible overturning, such as a ship-like, circular, or polygonal shape.

Two gimbal shaft bearings (4) are installed at the center of the bottom (2) of the main floating body (1) to support the control moment gyro (5) on both sides. The gimbal shafts (6a and 6b) of the control moment gyro (5) rest and turn freely on said gimbal shaft bearings (4). The gimbal (6) is a sealed cylindrical vessel, in which a flywheel (7) is mounted and rotates freely on the spin shaft (7a). Said spin shaft (7a) is installed at right angles to said gimbal shafts (6a and 6b). A spin motor (8) is installed on the spin shaft (7a) of the flywheel (7). The spin motor (8) is set within or on the outside of the vessel and is sealed to prevent air from entering the vessel. The sealed vessel forming the gimbal (6) is connected to a vacuum pump (not shown). This negative pressure pump is used to reduce the pressure inside the gimbal (6) to, for example, 0.1 atmospheric pressure or below to decrease flywheel drag (7) and windage loss.

The gimbal (6) is connected, on the gimbal shaft (6b) side, to the power generator (10) via gearing to increase speed (9) that comprises a gear mechanism and others so that power is generated as the gimbal (6) rotates. The power generator (10) is connected, regardless of the direction the gimbal (6) rotates, to a power converter (not shown) or a battery H. Kanki (not shown) via a compatible rectifier. The shaft (6a) on the other side of the gimbal (6) accommodates the spin motor (8) and brushes (11) that supply power to the vacuum pump motor. These units are connected to a power supply. A brake may also be installed to stop the flywheel in the event of an emergency such as an accident. The power generator (10) is mounted on a base (12) on the bottom of the main floating body. The control moment gyro is similar to conventional units in terms of its basic structure and operation, and therefore a description of its operating principle is omitted here.

The main floating body (1) is equipped with a controller (13) to control power and the power generator. The main floating body (1) is also fitted with a pump (not shown) and a valve (not shown) to adjust the volume of ballast water pumped into the floating body. By adjusting the volume of ballast water, the natural frequency of the floating body can be synchronized with the wave frequency. The main floating body (1) is also provided with a motion sensor (14) to detect the inclination and angular speed of the main floating body (1) and an encoder (15) (a sensor to detect the direction of the gimbal shaft) to detect the angle of rotation and the position of the gimbal (6). These sensors are electrically connected to the controller (13) mounted on the main floating body (1).

The generator and other equipment mounted on the main floating body (1) are protected from sea water spray and splashing by a cover (16).

The following is a description of the operation of the gyro wave-activated power generator constructed as detailed above.

The gyro wave-activated power generator is set on the sea surface with the flywheel (7) driven by the spin motor (8) and rotating at high speed. The motion (inclination) of the main floating body (1) caused by wave action is transferred to the control moment gyro (5) to turn the gimbal (6) and drive the generator (10) via gearing to increase speed (9) to generate power. The generated power is stored in a battery H. Kanki or supplied directly to operate an actuator.

While power is being generated, the controller uses signals from the motion sensor (14) to detect the inclination and angular speed of the main floating body (1) and the encoder (15) (sensor to detect the direction of the gimbal shaft) to detect the rotation angle and position of the gimbal (6). The controller synchronizes the motion of the floating body with the rotation of the control moment gyro body using the circuit shown in the control block diagram in FIG. 3. The speed of the gyro (6) is controlled on the generator side to generate power most efficiently. Ballast water is pumped into the floating body (1) at a controlled volume to synchronize the natural frequency of the floating body motion to the wave frequency to further enhance power generation efficiency. This system is particularly effective when wave magnitude and frequency differ during the summer and winter seasons.

Software programs installed on a PC are used to control the power generator and volume of ballast water.

The power generating efficiency of the CMG system (gyro wave-activated power generation) of the present invention was compared with the output from an existing floating body air turbine type system. The result of a typical example is shown below.

The efficiency values of the CMG system of the present invention were obtained by synthesizing three stages of conversion efficiencies as follows:

(1) First conversion efficiency from wave motion to floating body motion: $\eta_1$=0.6 to 0.9
(2) Conversion efficiency from floating body motion to CMG output shaft:
$\eta_2$=0.9 to 0.95
(3) Conversion efficiency from CMG output shaft to output of electricity from the generator: $\eta_G$=0.8 to 0.9

The synthesized efficiency $\eta_T$ was 0.43 to 0.77.

For evaluating existing floating body air turbine systems such as Kaimei and Mighty Whales, the power generation efficiency was obtained by synthesizing five stages of conversion efficiencies as follows:

(1) First conversion efficiency from wave motion to floating body motion: $\eta_1$=0.6 to 0.9
(2) Conversion efficiency from floating body motion to water column motion: $\eta_C$=0.8
(3) Conversion efficiency from water column motion to air motion: $\eta_a$=0.9 to 1.0
(4) Conversion efficiency from air motion to turbine output: $\eta_t$=0.3 to 0.6 (Wells Turbine)
(5) Conversion efficiency from turbine output to generator output: $\eta_G$=0.8 to 0.9

The synthesized efficiency $\eta_T$ was 0.10 to 0.39.

Stages (1) and (5) are common in both cases, indicating that the turbine is responsible for the deteriorated efficiency.

With the CMG system, the efficiency from the floating body motion to the generator input $\eta_2$ was 0.9 to 0.95 because only momentum conversion is involved with no loss other than mechanical loss. With the air turbine system, on the other hand, conversion takes place at three stages, with the result that $\eta_2$=0.216 to 0.48, or approximately twice the level of the CMG system.

Relationship Between Wave Height and Power Generator Output

Figure 6:
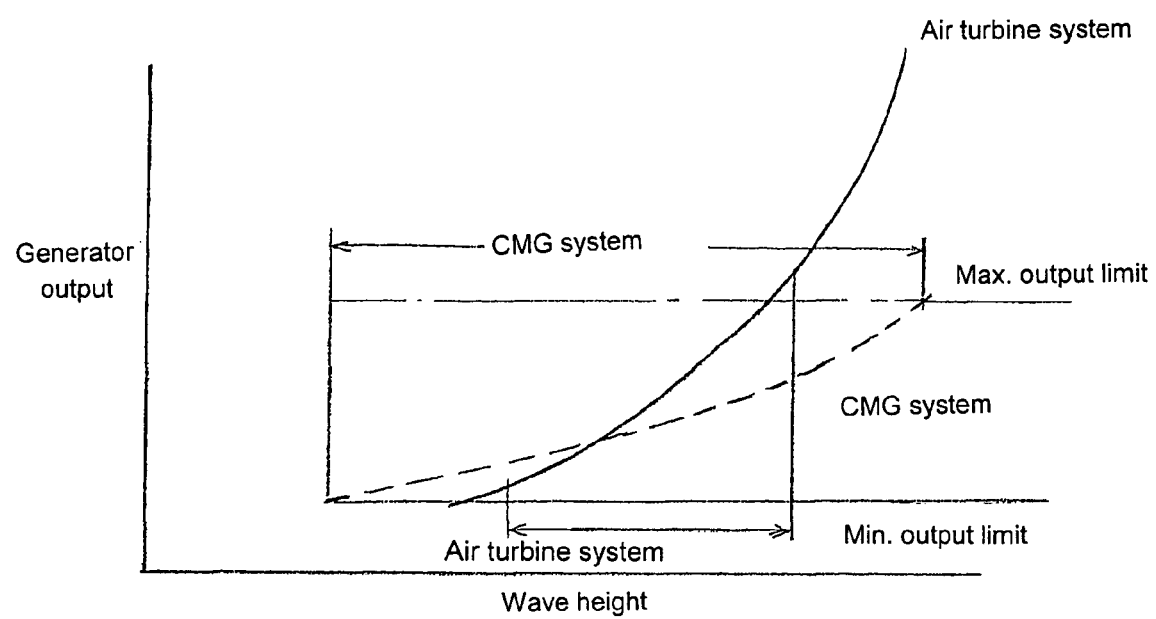
FIG. 6 shows the relationship between wave height and power generator output.

Frequency decreases with increasing wave height and conversely increases at lower wave height. As a result, the output characteristics of the generator have the tendency shown in FIG. 6. With the CMG system, the decrease in output is small even when wave height is low while the output is not too large when wave height is high. This stable output is favorable for system operation.

Figure 4:
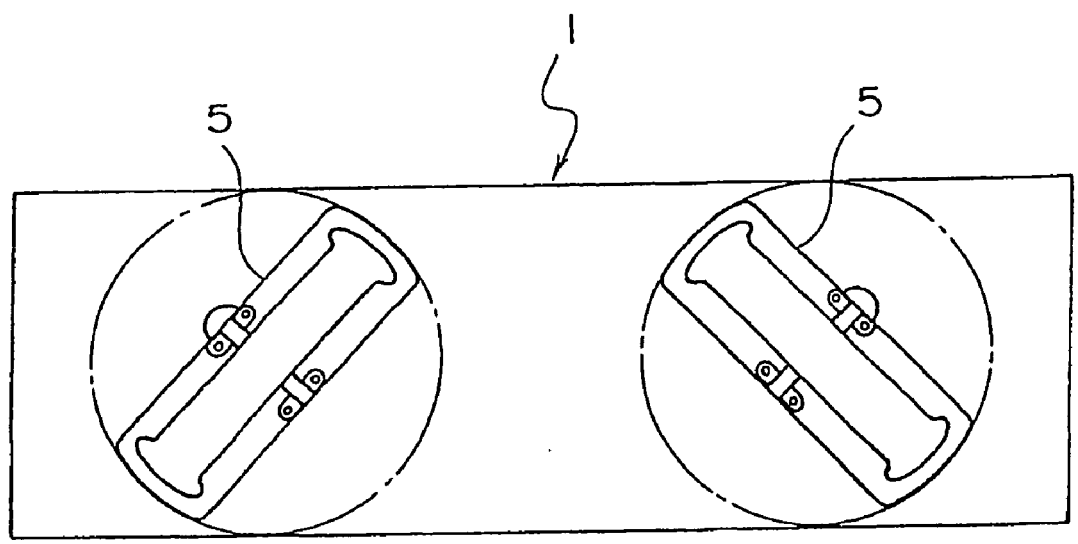
FIG. 4 is the plan of a typical layout of an array of control moment gyros of the gyro wave-activated power generator of the present invention.

In addition to the working of the present invention that has already been explained, it should be noted that multiple sets of control moment gyros as used in the present invention may be installed on a single floating body. FIG. 4, for example, shows a set of two gyros installed on the floating body in a different orientation to generate electric power stably regardless of the wave direction.

Wave action is basically a circular motion. It is preferable to have the gimbal rotate in the same basic direction as said circular wave motion and set the gyro body at an angle to the incoming wave direction.

Figure 5:
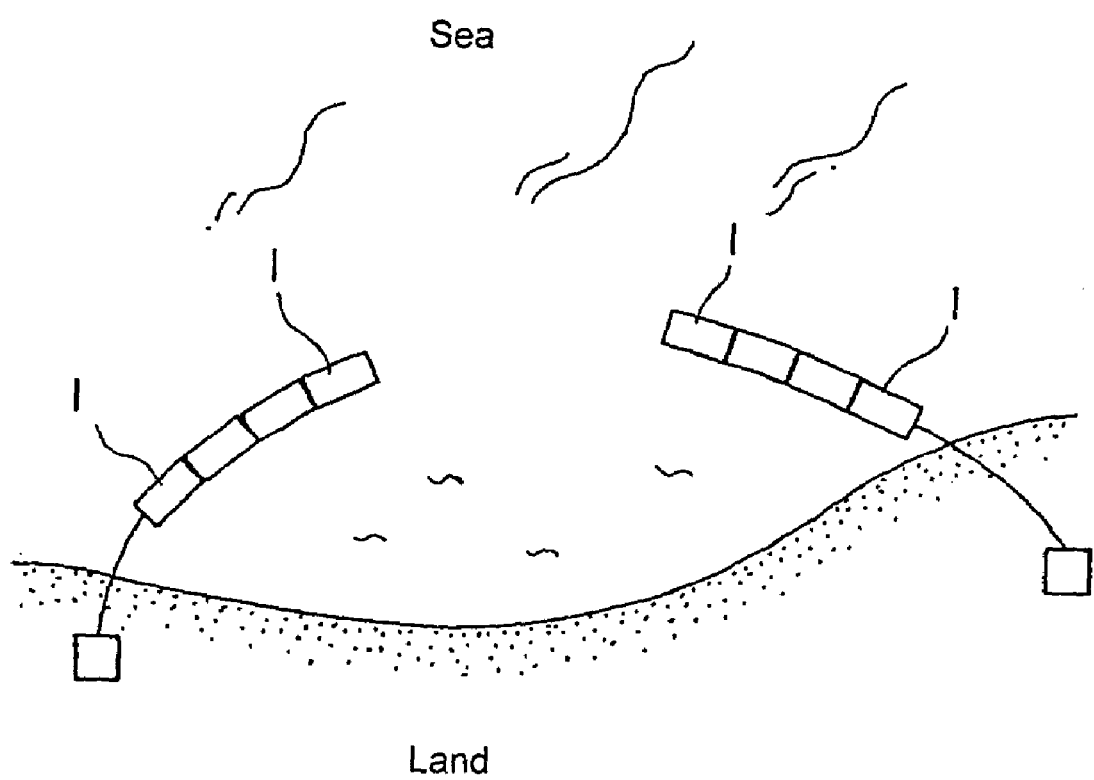
FIG. 5 is an illustration that describes a wave suppressor comprising an array of multiple gyro wave-activated power generators of the present invention.

Two or more wave-activated power generators of the present invention may be arrayed to form a sort of breakwater as shown in FIG. 5 to construct a wave suppressor that creates a calm sea area.

The present invention may be implemented in various other forms of embodiment without deviating from the spirit of its main features. The above-mentioned embodiments are only a few examples and should not be construed as limiting.

INDUSTRIAL APPLICABILITY

As described in detail in the above paragraphs, the gyro wave-activated power generator of the present invention captures the motion of a floating body on the sea with a control moment gyro, and it generates electric power efficiently using the captured energy. It is possible to reduce flywheel resistance in the gimbal by maintaining the inside of the sealed gimbal enclosure, a component of the present invention, at a negative pressure using a vacuum pump. This decreases the energy to drive the spin motor. Multiple sets of control moment gyros may be installed on a single floating body to prevent unwanted motion of the floating body and generate electric power efficiently. Power generating efficiency can be improved by synchronizing the natural frequency of the floating body motion to the wave frequency by pumping ballast water into the floating body at a controlled volume. Multiple floating bodies equipped with power generators may be arrayed to form a sort of breakwater to be used as wave suppressor to create a calm sea area. These are some of the excellent effects of the present invention and its embodiments.

What is claimed is:

1. A gyro wave-activated power generator comprising:
   a floating body, multiple control moment gyros supported by said floating body wherein said gyros are installed on said floating body in a different orientation from each other, and
   a power generator connected to a gimbal shaft of each of said gyros via gearing to increase speed wherein a gimbal of each of said gyros is rotated by the motion of said floating body produced by wave action which drives said power generator to generate power.

2. A gyro wave-activated power generator comprising:
   a floating body, a two or more control moment gyros supported by said floating body, and
   a power generator connected to the a gimbal shaft of each of said gyros via gearing to increase speed,
   wherein the gimbal of each of said gyros is continuously rotated in a circle by the motion of said floating body produced by wave action which drives said power generator to generate power.

3. A wave suppressor comprising multiple gyro wave-activated power generators as claimed in claim 2, wherein said multiple power generators are arrayed on the surface of the sea.

4. A gyro wave-activated power generator as claimed in claim 2, wherein the gyro speed for each of said gimbals is controlled to synchronize the motion of the floating body with the rotation of the control moment gyros.

5. A wave suppressor comprising multiple gyro wave-activated power generators as claimed in claim 4, wherein said multiple power generators are arrayed on the surface of the sea.

6. A gyro wave-activated power generator as claimed in claim 2, wherein ballast water is pumped into said floating body to synchronize the natural frequency of the floating body to the wave frequency.

7. A wave suppressor comprising multiple gyro wave-activated power generators as claimed in claim 6, wherein said multiple power generators are arrayed on the surface of the sea.

8. A gyro wave-activated power generator as claimed in claim 6, wherein the gyro speed is controlled to synchronize the motion of the floating body with the rotation of the control moment gyros.

9. A wave suppressor comprising multiple gyro wave-activated power generators as claimed in claim 8, wherein said multiple power generators are arrayed on the surface of the sea.

10. A gyro wave-activated power generator comprising:
    a floating body, a control moment gyro supported by said floating body, and a power generator connected to the gimbal shaft of said gyro via gearing to increase speed,
    wherein the gimbal of said gyro is rotated by the motion of said floating body produced by wave action which drives said power generator to generate power, and
    wherein ballast water is pumped into said floating body to synchronize the natural frequency of the floating body to the wave frequency.

11. A gyro wave-activated power generator as claimed in claim 10, wherein the gyro speed is controlled to synchronize the motion of the floating body with the rotation of the control moment gyro.

12. A wave suppressor comprising multiple gyro wave-activated power generators as claimed in claim 10, wherein said multiple power generators are arrayed on the surface of the sea.

13. A gyro wave-activated power generator comprising:
    a floating body, multiple control moment gyros supported by said floating body, each of which generates power, and a power generator connected to the gimbal shaft of each of said gyros via gearing to increase speed,
    wherein the gimbal of each of said gyros is rotated by the motion of said floating body produced by wave action which drives said power generator to generate power, and
    wherein ballast water is pumped into said floating body to synchronize the natural frequency of the floating body to the wave frequency.

14. A wave suppressor comprising multiple gyro wave-activated power generators as claimed in claim 13, wherein said multiple power generators are arrayed on the surface of the sea.

15. A gyro wave-activated power generator as claimed in claim 13, wherein the gyro speed is controlled to synchronize the motion of the floating body with the rotation of the control moment gyro.

16. A gyro wave-activated power generator comprising:
a floating body, a control moment gyro supported by said floating body, and a power generator connected to the gimbal shaft of said gyro via gearing to increase speed,
wherein the gimbal of said gyro is rotated by the motion of said floating body produced by wave action which drives said power generator to generate power, and
wherein the gyro speed is controlled to synchronize the motion of the floating body with the rotation of the control moment gyro.

17. A wave suppressor comprising multiple gyro wave-activated power generators as claimed in claim 16, wherein said multiple power generators are arrayed on the surface of the sea.

18. A gyro wave-activated power generator comprising:
a floating body, multiple control moment gyros supported by said floating body, each of which generates power, and a power generator connected to the gimbal shaft of each of said gyros via gearing to increase speed,
wherein the gimbal of each of said gyros is rotated by the motion of said floating body produced by wave action which drives said power generator to generate power, and
wherein the gyro speed is controlled to synchronize the motion of the floating body with the rotation of the control moment gyros.

19. A wave suppressor comprising multiple gyro wave-activated power generators as claimed in claim 18, wherein said multiple power generators are arrayed on the surface of the sea.

* * * * *